United States Patent [19]
Agate et al.

[11] Patent Number: 5,523,949
[45] Date of Patent: Jun. 4, 1996

[54] METHOD AND APPARATUS FOR AN IMPROVED AUTOPILOT SYSTEM PROVIDING FOR LATE RUNWAY CHANGE

[75] Inventors: Robert M. Agate, Everett; Ronald J. Bloom, Bellevue; John E. Cashman, Redmond; Robert E. Chaney, Bellevue; John C. Griffin, III, Tacoma; Charles A. Hovland, Des Moines, all of Wash.; Ronald Lilischkies, Avon, Colo.; Joseph M. MacDonald, Issaquah, Wash.; Timothy C. McRoberts, Kirkland, Wash.; Frank P. Santoni, Jr., Redmond, Wash.

[73] Assignee: The Boeing Company, Seattle, Wash.

[21] Appl. No.: 286,317

[22] Filed: Aug. 5, 1994

[51] Int. Cl.⁶ ............................ G05D 1/04; G05D 1/10
[52] U.S. Cl. .................. 364/429; 364/428; 364/433; 364/434; 364/430
[58] Field of Search .................. 364/428, 449, 364/434, 430, 429, 433, 443; 244/178, 183, 184, 196; 340/951, 948

[56] References Cited

U.S. PATENT DOCUMENTS

| | | | |
|---|---|---|---|
| 2,960,284 | 11/1960 | Perkins . | |
| 3,265,333 | 8/1966 | Montooth | 244/77 |
| 3,578,270 | 5/1971 | Ellis | 244/83 |
| 3,686,626 | 8/1972 | Bateman et al. | 340/27 |
| 3,738,594 | 6/1973 | Donovan | 244/76 R |
| 3,776,455 | 12/1973 | Gee | 364/428 |
| 3,807,666 | 4/1974 | Devlin | 244/77 |
| 4,109,886 | 8/1978 | Tribken et al. | 244/178 |
| 4,368,517 | 1/1983 | Loveing | 364/428 |
| 4,373,184 | 2/1983 | Lambregts | 364/434 |
| 4,534,000 | 8/1985 | Blin | 364/428 |
| 4,866,450 | 9/1989 | Chisholm | 342/410 |
| 4,956,780 | 9/1990 | Sankrithi et al. | 364/428 |
| 4,999,780 | 3/1991 | Mitchell | 364/428 |
| 5,012,423 | 4/1991 | Osder | 364/452 |
| 5,017,930 | 5/1991 | Stoltz et al. | 342/465 |
| 5,020,747 | 6/1991 | Orgun et al. | 244/187 |
| 5,047,942 | 9/1991 | Middleton et al. | 364/427 |
| 5,060,889 | 10/1991 | Nadkarni et al. | 244/183 |
| 5,343,395 | 8/1994 | Watts | 364/428 |

*Primary Examiner*—Michael Zanelli
*Assistant Examiner*—Thai Phan
*Attorney, Agent, or Firm*—James P. Hamley

[57] ABSTRACT

An improvement to an autopilot flight director system allows the flight crew to make a late runway change without disengaging the autopilot. The improved system allows a transition to a new runway assignment if radio altitude is greater than 1500 feet. Control logic determines whether or not localizer and/or glideslope have been captured and enters predetermined modes as a function thereof to effect a transition to the new approach while enabling instrument landing system retuning while maintaining autopilot engagement. Flight crew workload during approach is significantly reduced as a result of implementation of the improved system.

21 Claims, 5 Drawing Sheets

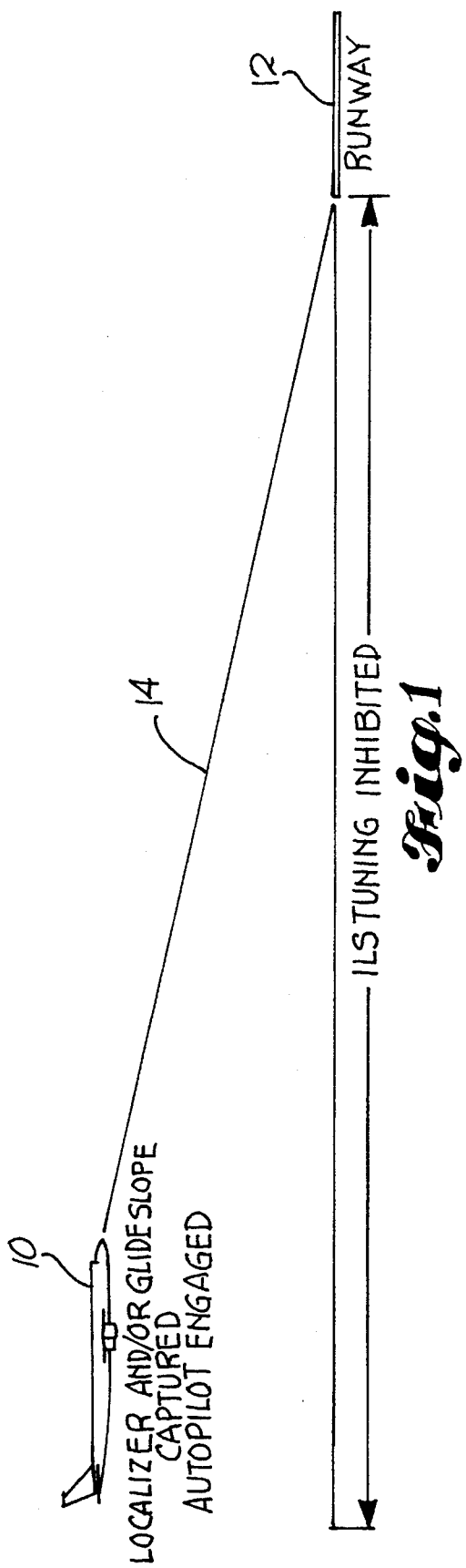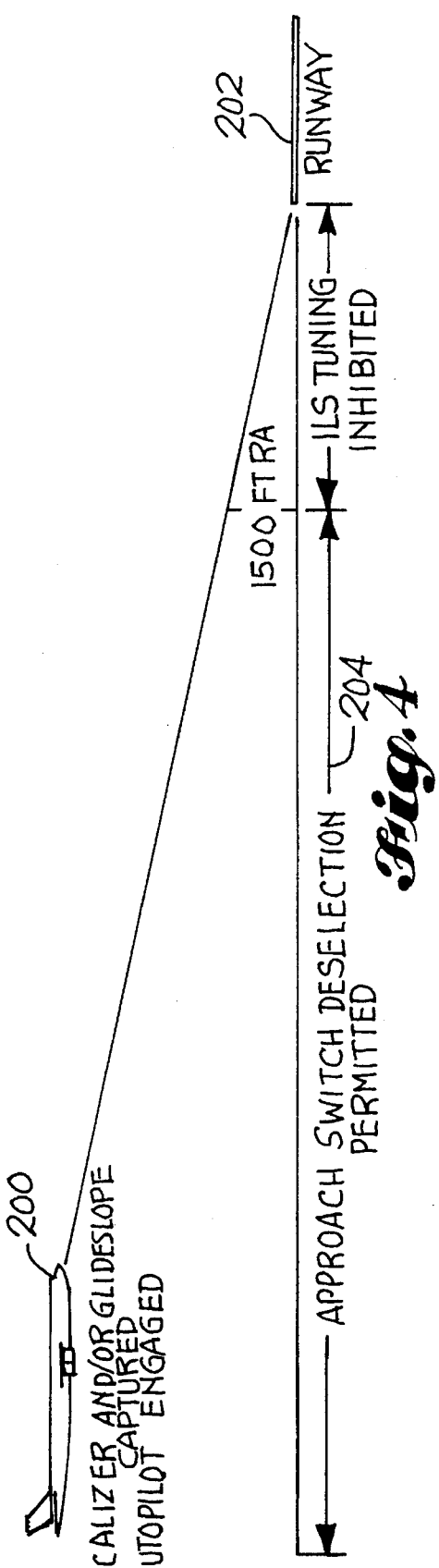

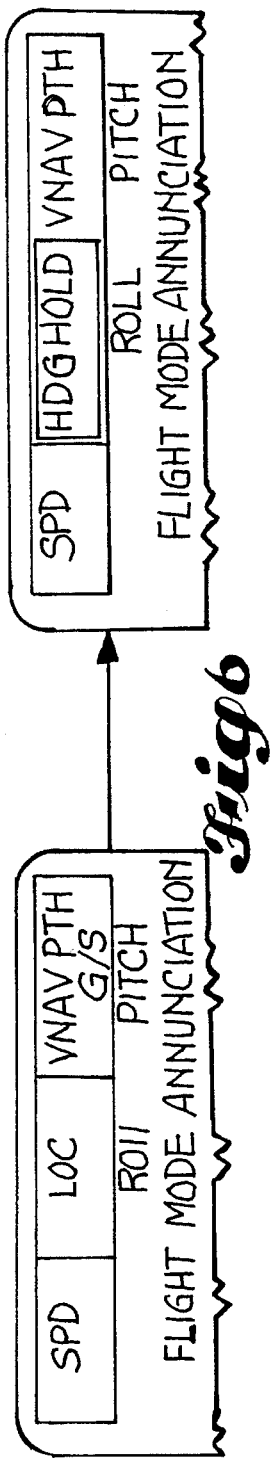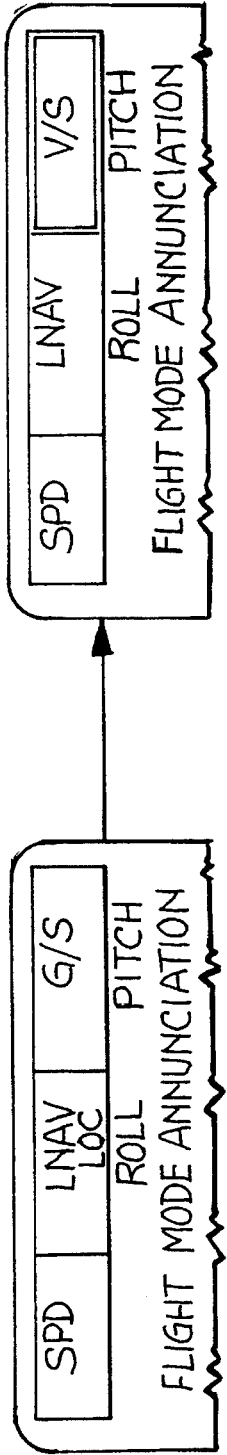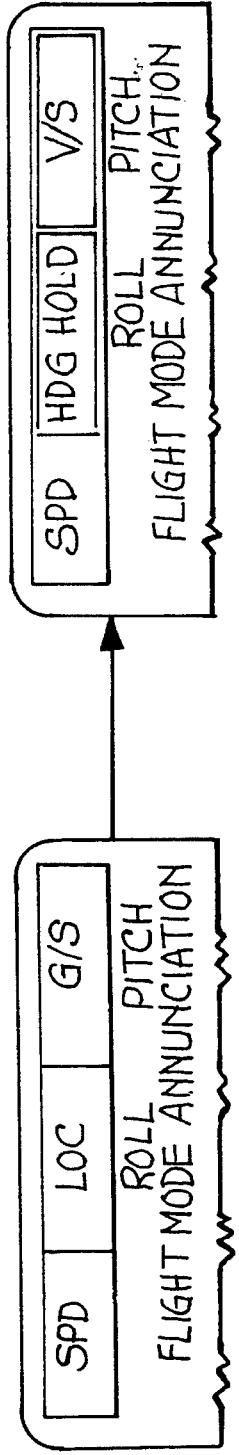

METHOD AND APPARATUS FOR AN IMPROVED AUTOPILOT SYSTEM PROVIDING FOR LATE RUNWAY CHANGE

BACKGROUND OF THE INVENTION

The present invention relates to the aircraft autopilot art and, in particular, to an improved autopilot system which allows the flight crew to maintain autopilot engagement while making a late runway change during approach.

A problem frequently encountered by commercial aircraft flight crews on approach to an airport is runway re-assignment. As the aircraft approaches an airport, it is assigned a runway and an approach profile by air traffic control. Due to various conditions that can occur, an aircraft is often re-assigned from one runway to another and is expected to make a smooth transition thereto. Such re-assignment may happen after the flight crew has engaged the autopilot and after the aircraft's on board instrument landing system (ILS) has captured either the assigned runway's localizer signal (which defines lateral movement within the approach profile) and/or glideslope (which defines the desired flight path to the assigned runway).

Conventional autopilot systems do not allow a change in ILS tuning with the autopilot engaged. Thus, in order to transition to a late runway change in a conventional autopilot system, the flight crew must go through a procedure to disengage the autopilot, manually fly the plane, re-tune to the new ILS approach, and then, if appropriate, re-engage the autopilot and select appropriate roll and pitch modes of the autopilot and, if desired, steer the airplane into a position for a manual landing, or into a position to recapture localizer and glideslope for the new runway assigmnent.

Approach is, however, one of the highest workload conditions a flight crew experiences. As such, it would be highly desirable if the autopilot could remain engaged during a transition to a late runway assigmnent and thereby alleviate flight crew workload.

SUMMARY OF THE INVENTION

It is an object of this invention, therefore, to provide an improved aircraft autopilot system which allows autopilot engagement during a transition from one runway assignment to another during approach.

It is a particular object in the invention to provide the above-improved autopilot system which allows autopilot engagement during approach transition, even if the localizer and/or glideslope from the first runway assignment has been captured.

Briefly, in an aircraft autopilot flight director system (AFDS) wherein, on approach, the flight crew selects an instrument landing system (ILS) signal for a particular runway and the AFDS captures a localizer and a glideslope signal to direct the aircraft to said runway, an improvement allows the flight crew to select a new ILS runway without disengaging the autopilot. The improvement includes an actuator which is actuated by the flight crew to initiate a desired runway change. Provided logic control means responds to the actuation of the actuator to:

in the event localizer but not glideslope of the initial ILS has been captured,
  i) maintain the aircrafts current pitch mode,
  ii) disarm glideslope capture,
  iii) transition aircraft roll to a predetermined roll mode, and
  iv) enable ILS tuning to the desired runway,
b) in the event glideslope but not localizer of the initial ILS has been captured,
  i) retain the current roll mode,
  ii) disarm localizer capture,
  iii) transition aircraft pitch to a predetermined pitch mode, and
  iv) enable ILS tuning to the desired runway, and
c) in the event both localizer and glideslope have been captured,
  i) transition aircraft roll to a predetermined roll mode,
  ii) transition aircraft pitch to a predetermined pitch mode, and
  iii) enable ILS tuning to the desired runway.

In the further aspect of the invention, the above described logic control means includes means responsive to actuation of the actuator subsequent to retuning of the ILS to the new runway to rearm the localizer and glideslope for the new approach.

In an aircraft autopilot flight director system (AFDS), on approach the flight crew selects an instrument landing system (ILS) signal for a particular runway and the AFDS captures a localizer and a glideslope signal to direct the aircraft to said runway, an improved method for allowing the flight crew to select a new ILS approach without disengaging the autopilot comprises the steps of:

a) providing an actuator for actuation by the flight crew to initiate the desired runway change; and
b) providing logic control means responsive to said actuation of said actuator for performing the steps of:
  1) in the event localizer but not glideslope of the initial ILS has been captured,
    i) maintain the aircraft's current pitch mode,
    ii) disarm glideslope capture,
    iii) transition aircraft roll to a predetermined roll mode, and
    iv) enable ILS tuning to the desired runway,
  2) in the event glideslope but not localizer of the initial ILS has been captured,
    i) retain the current roll mode,
    ii) disarm localizer capture,
    iii) transition aircraft pitch to a predetermined pitch mode, and
    iv) enable ILS tuning to the desired runway,
  3) in the event both localizer and glideslope have been captured,
    i) transition aircraft roll to a predetermined roll mode,
    ii) transition aircraft pitch to a predetermined pitch mode, and
    iii) enable ILS tuning to the desired runway.

In a further aspect of the improved method, the provided logic control means further performs the step of responding to actuation of said actuator subsequent to retuning of the ILS to the new runway to rearm the localizer and glideslope for the new approach.

BRIEF DESCRIPTION OF THE DRAWINGS

FIG. 1 illustrates an aircraft on approach to a runway and depicts prior art autopilot systems which do not allow tuning of the ILS to a new approach when the autopilot is engaged;

FIG. 4 depicts an aircraft on approach to a runway and illustrates, in accordance with the present invention, the zone over which the ILS can be returned to a new approach without autopilot disengagement;

FIG. 6 illustrates mode changes as indicated by the primary flight display during a transition in which localizer, but not glideslope has been captured;

FIG. 7 illustrates mode changes as reflected by the primary flight display in an approach transition wherein glideslope, but not localizer, has been captured; and FIG. 8 illustrates mode changes, as depicted by the primary flight display, during an approach transition wherein both localizer and glideslope have been captured.

DETAILED DESCRIPTION

FIG. 1 is a side profile of a commercial aircraft 10 on approach to a runway 12. In accordance with standard practice, the aircraft 10 in approaching an airport will be assigned clearance for an approach to a given runway by air traffic control. The flight crew of the aircraft 10 will commonly engage the autopilot and tune their onboard instrument landing system (ILS) to the guidance signal corresponding to the assigned runway. The guidance signal includes a localizer, which defines the lateral position of the aircraft on approach and a glideslope signal, defining the glideslope 14 to the assigned runway 12. Both localizer and glideslope signals are individually captured by the autopilot flight director system (AFDS) which is a part of the aircraft's autopilot. Once captured, localizer and glideslope signals are used to guide the aircraft 10 to the runway 12.

It is not uncommon for air traffic control to approve approach to a first runway but then require a transition to a second runway—this due to changing conditions and the need to most efficiently use the available runways. However, with the autopilot engaged and localizer and/or glideslope captured, the flight crew on conventional aircraft have been forced to go through a series of steps, including disengagement of the autopilot, to transition to the new approach. Since the approach phase is already demanding on the flight crew's time, it would be beneficial if the autopilot could remain engaged throughout the transition to a new runway assignment.

Figure 2A:
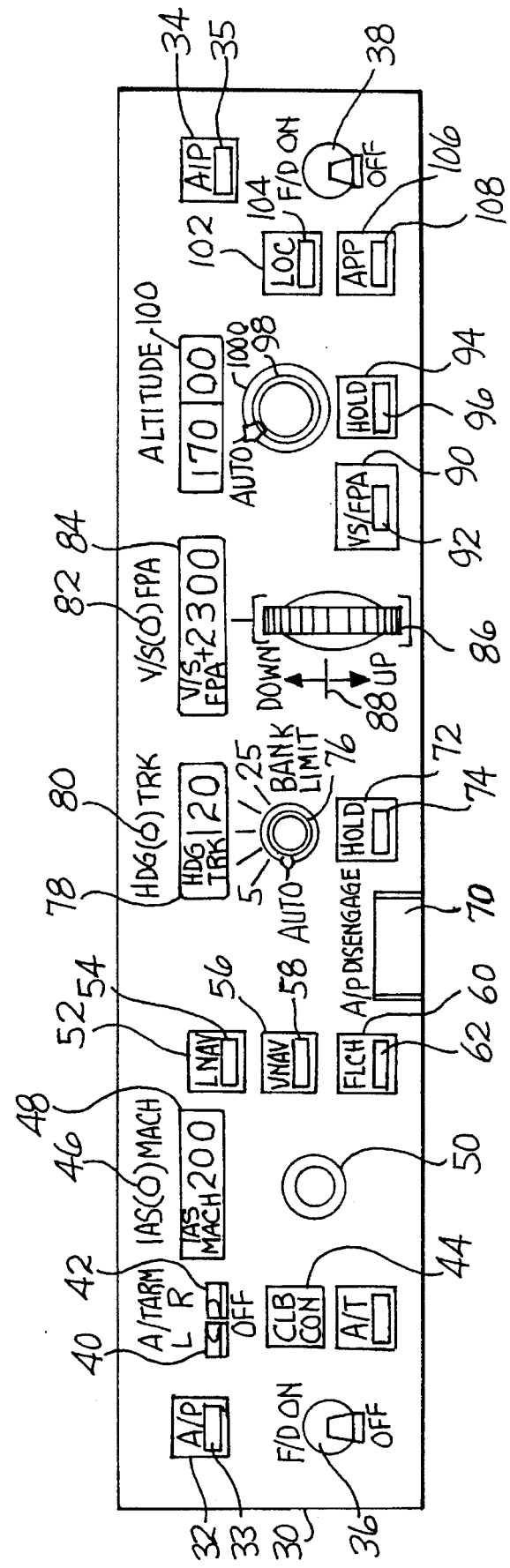
FIG. 2A a depicts an autopilot flight director system mode control panel.

The burden on the flight crew to make a late runway change is better understood with respect to FIG. 2A, which illustrates a conventional commercial aircraft autopilot flight director system (AFDS) mode control panel, indicated generally at 30. In the upper left and right hand corners of the panel 30 are autopilot (A/P) engage switches 32, 34 with their corresponding engage lights 33, 35, respectively, In the lower left and right hand corners of the mode control panel 30 are the Flight Director (F/D) switches 36, 38, respectively.

To the right of the autopilot switch 32 is an autothrottle (A/T) left arm switch 40 and an autothrottle right arm switch 42. Directly below the autothrottle arm switches 40, 42 is a climb/continuous thrust switch 44.

To the right of the autothrottle arm switches 40, 42 is an inertial airspeed (IAS) MACH reference switch 46 which allows the flight crew to enter a desired aircraft speed either as an airspeed value or a MACH number. The selected value is displayed in an IAS/MACH digital display 48 positioned directly below the switch 46. Below the digital display 48 is an IAS/MACH selector switch 50. To the right of the selector switch 50 are three vertical switches with indicator lights; 1) LNAV switch 52 with its corresponding indicator light 54, 2) VNAV switch 56 with its corresponding indicator light 58, and 3) a flight level change (FLCH) switch 60 with its corresponding indicator light 62.

To the right of the vertical switches 52, 56 and 60 is an autopilot disengage bar 70.

To the right of the autopilot disengage bar 70 is a heading/track hold switch 72 and it's corresponding indicator light 74. Above the heading/track hold switch 72 is a bank limit selector switch 76 which, as shown, allows selection from an "AUTO" position through 5° increments to a maximum bank limit, here indicated as "25".

Directly above the bank limit selector 76 is a digital display 78 which indicates the heading/track of the aircraft. Whether heading or track is displayed is determined by a heading/track reference switch 80 which is positioned directly above the heading/track display 78.

To the right of the heading/track reference switch 80 is a vertical speed/flight path angle reference switch 82. Directly below the vertical speed/flight path angle reference switch 82 is a digital display 84 which, as determined by switch 82, reads out the vertical speed or flight path angle value as input by the flight crew. Directly below the digital display 84 is a vertical speed/flight path angle selector 86. The selector 86 is a thumbwheel driven switch which allows the flight crew to input a "down" value by actuating the selector 86 in one direction or "up" value by actuation of selector 86 in the opposite direction, as indicated by an adjacent legend 88.

The flight crew inputs a desired vertical speed or flight path angle via the vertical speed/flight path angle switch 90 with its corresponding indicator light 92, which is to the right of the selector 86.

To the right of the vertical speed/flight path angle switch 90 is an altitude hold switch 94 with its corresponding indicator 96. Above the altitude hold switch 94 is an altitude selector 98. The altitude selector is controllable by the flight crew in an "auto"mode or increments of "1000" mode. In the increments of "1000" mode, turning the altitude selector 98 increments or decrements the altitude value displayed in the altitude window 100 by thousands of feet. With the "auto" mode selected, turning the altitude selector increments or decrements the altitude value displayed in the window at a variable rate, depending on the amount of altitude change commanded by the turning of the selector.

Directly above the altitude selector 98 is an altitude window 100 which provides a digital display of the selected altitude.

To the right of the altitude selector 98 is a localizer switch 102 with its corresponding indicator 104. Directly below the localizer switch 102 is an approach switch 106 with its indicator light 108.

Figure 2B:
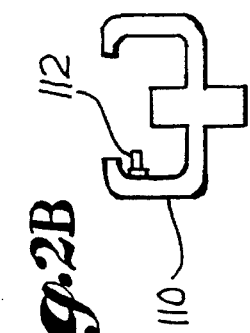
FIG. 2B depicts the pilot's control wheel with autopilot disarm switch.

Shown in FIG. 2B is a diagram of tile flight crews'control wheel 110 which, in the normal manner, is provided with an autopilot disengage switch 112.

In modern commercial aircraft, the automatic flight control system consists of an autopilot flight director system (AFDS) and an autothrottle system. The AFDS is controlled using the mode control panel 30 and the aircraft's flight management computer (FMC) (not shown). The autothrottle is controlled through the mode control panel 30 and the FMC.

Normally, the AFDS and autothrottle are controlled automatically by the FMC to perform climb, cruise, descent and initial approach flight path guidance. Final approach and landing guidance is provided by the AFDS with control inputs from an ILS system with the pilot controlling speed inputs to the autothrottle through the speed selector 50.

The AFDS normally is comprised of three autopilot flight director computers and the mode control panel 30. The mode control panel 30 provides control of the autopilot, flight director, altitude alert, and autothrottle systems. The mode control panel 30 is used to select and activate AFDS modes and establish altitudes, speeds, and climb/descent profiles.

Figure 3:
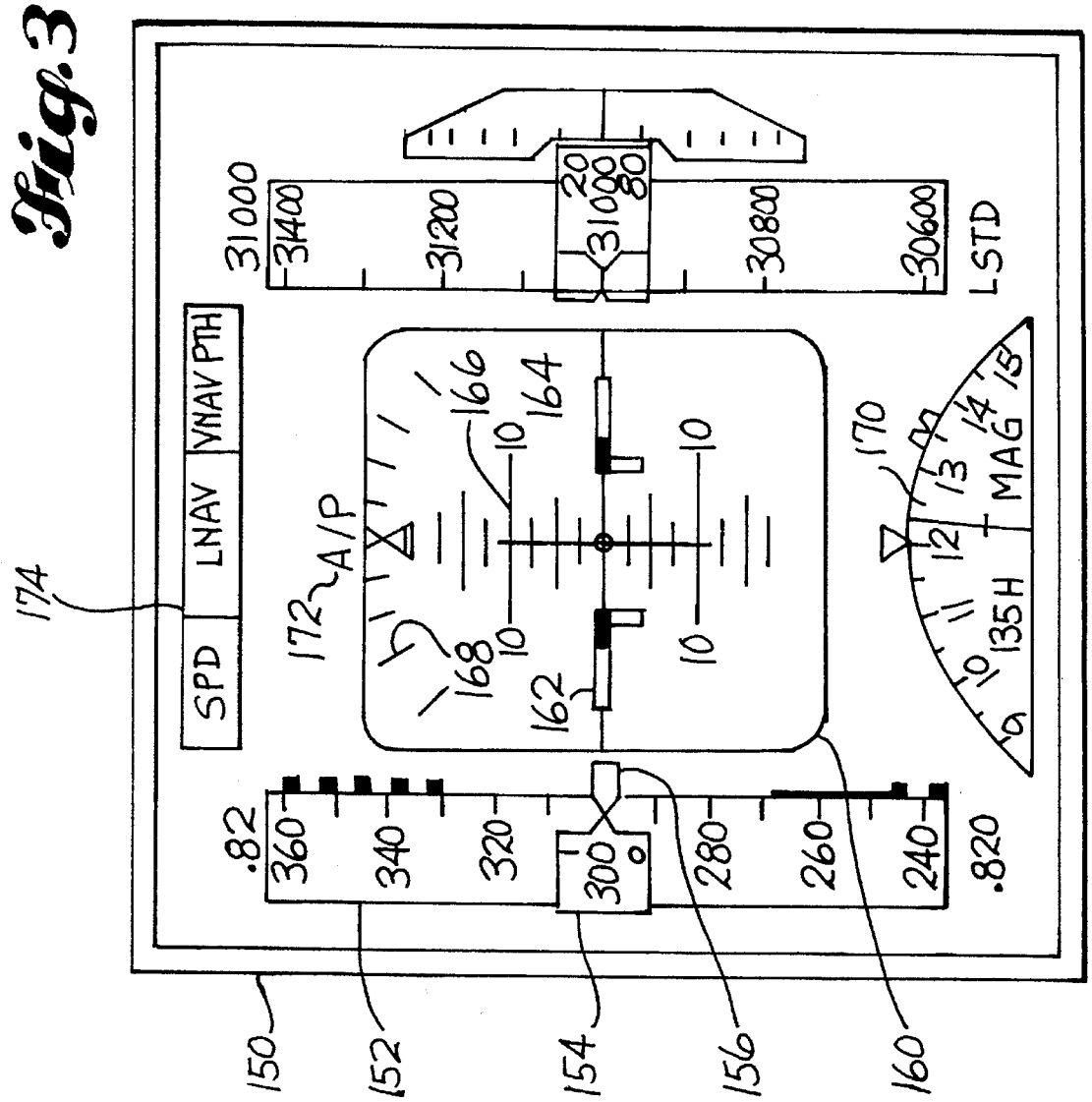
FIG. 3 depicts an aircraft's primary flight display.

The AFDS's provide control of the flight directors and autopilots. Flight director information is displayed on the priming/flight display (PFD), an example of which is illustrated in FIG. 3. The AFDS does not have direct control of the flight control surfaces. The autopilot controls the elevators, ailerons, flaperons, and spoilers through the flight control system. Autopilot rudder commands are added only during an autopilot approach and landing. The autopilot controls nose wheel steering during roll out after an automatic landing.

The mode control panel 30 mode switches are used to select automatic control modes. The light in the lower half of each switch illuminates to indicate that the mode is selected. Mode engagement is indicated by the PFD (see FIG. 3) roll and pitch flight mode annunciation.

Most flight control modes engage with a single push of a switch. These modes are: flight level change, via flight level change switch 60, heading hold, via heading/track hold switch 72 in conjunction with heading/track reference switch 80, track hold, via heading/track hold switch 72 in conjunction with heading/track reference switch 80, heading select, via heading/track selector 76, track select, via heading/track selector 76, vertical speed, via vertical speed flight path angle switch 90 in conjunction with vertical speed/flight path angle reference switch 82, flight path angle, via vertical speed/flight path angle switch 90 in conjunction with vertical speed/flight path angle reference switch 82, altitude hold, via altitude hold switch 94, climb thrust, via climb/continuous thrust switch 44 and continuous thrust, via climb/continuous thrust switch 44.

Other modes arm or engage with a single push. These modes are: lateral navigation, via LNAV switch 52, vertical navigation, via VNAV switch 56, localizer, via localizer switch 102, and approach, via approach switch 106. All modes except localizer and approach can be disengaged by selecting another As described above, the flight crew can enter desired target values for mode. flight, via mode control panel 30 for: airspeed and MACH, as indicated in display 48, heading and track, via display 78, vertical speed and flight path angle, via display 84, and altitude, via display 100.

The autopilot is engaged by pushing either of the two autopilot engage switches 32, 34. Normal autopilot disengagement is through the control wheel 110 autopilot disengage switch 112.

FIG. 3 is a diagram illustrating a conventional primary flight display (PFD), indicated generally at 150. The PFD 150 indicates both the actual and target values of aircraft speed, pitch, and roll as may be selected through the mode control panel 30 of FIG. 2A.

As shown in FIG. 3, on the left vertical side of the display is an airspeed/MACH indicator 152. The airspeed indicator 152 is generally rectangular, indicating in a central window 154 the aircraft's current airspeed, here indicated as "300". From the bottom to the top of the airspeed indicator 52 are corresponding lower to higher airspeed values, here ranging from a value of "240" to a value of "360". Opposite the indicated airspeed 154 is a selected speed bug 156, here indicating that the aircraft's actual airspeed corresponds to that selected by the flight crew. At the top of the airspeed indicator 152 is an indication of the selected speed, here indicated as MACH 0.82. At the bottom of the airspeed indicator 152 is an indication of the current MACH of the aircraft, here indicated as "820".

To the right of the airspeed indicator 152, and centrally located on the PFD 150 is the attitude, steering and miscellaneous indication display 160. This display includes a conventional representation of the position of the aircraft wings 162, 164 relative to a pitch up or down scale 166 with a relative roll scale 168. Displayed below display 160 is a semi-circular display of aircraft heading and track 170.

At the top of the display 150 is an indicator 172, here displaying "A/P" indicating that the autopilot flight director systems have been activated. Above the display 172 is a flight mode annunciation display 174 which includes a portion identified as "SPD" to indicate the autothrottle thrust mode, a central display to indicate the aircraft's roll mode, here indicated as "LNAV", and a right hand portion, indicating the aircraft's pitch mode, here indicated as "VNAV PTH".

Prior to the present invention, and returning to FIG. 2A, on approach to an airport, air traffic control would issue clearance for an approach to a given runway. The flight crew would then, typically, engage the autopilot, via the autopilot engage switches 32 and/or 34 and, via the ILS system, tune to the guidance signals corresponding to the assigned runway. The ILS system would then proceed to capture either localizer, glideslope or both localizer and glideslope for the assigned approach.

It is not uncommon, however, for air traffic control to direct an aircraft from one assigned runway to another. Thus, in accordance with prior art systems, in order for the flight crew, once localizer and/or glideslope had been captured to transition to the new assigned approach, the following procedure would be followed:

1) the autopilot would be disengaged by disengage switch 112 on the control wheel 110, thus requiring the aircraft to be flown by hand, 2) both flight director switches 36 and 38 would have to be turned off and then back on, 3) the ILS system would then have to be returned to the new approach frequency, 4) the autopilot would then be re-engaged via either of switches 32, 34 and 5) the approach switch 106 would then be reselected.

Without following tile above procedure, the ILS system could not be returned to the new approach.

The improved autopilot (in particular, AFDS) according to the present invention, provides for ILS retuning without disengagement of the autopilot, as depicted generally in FIG. 4. Here, shown is an aircraft 200 approaching a runway 202. As before, it is assumed that the flight crew has been assigned to a particular runway 202 and that the crew has engaged the autopilot and that the ILS system has captured either localizer and/or glideslope. As indicated in FIG. 4, over the range 204, the present invention allows for retuning of the ILS system without disengagement of the autopilot so long as the aircraft has not descended to a radio altitude of 1500 feet. Thus, the flight crew does not need to follow the elaborate procedure described above for ILS retuning and, during the transition to the new assigned runway, has reduced workload due to the autopilot remaining engaged.

Once the aircraft 200 has descended below 1500 feet radio altitude, the improvement according to the present invention is inhibited and the flight crew must disengage the AFDS to discontinue the approach. This is necessary to allow sufficient time for AFDS internal checks to preserve automatic landing integrity.

Figure 5:
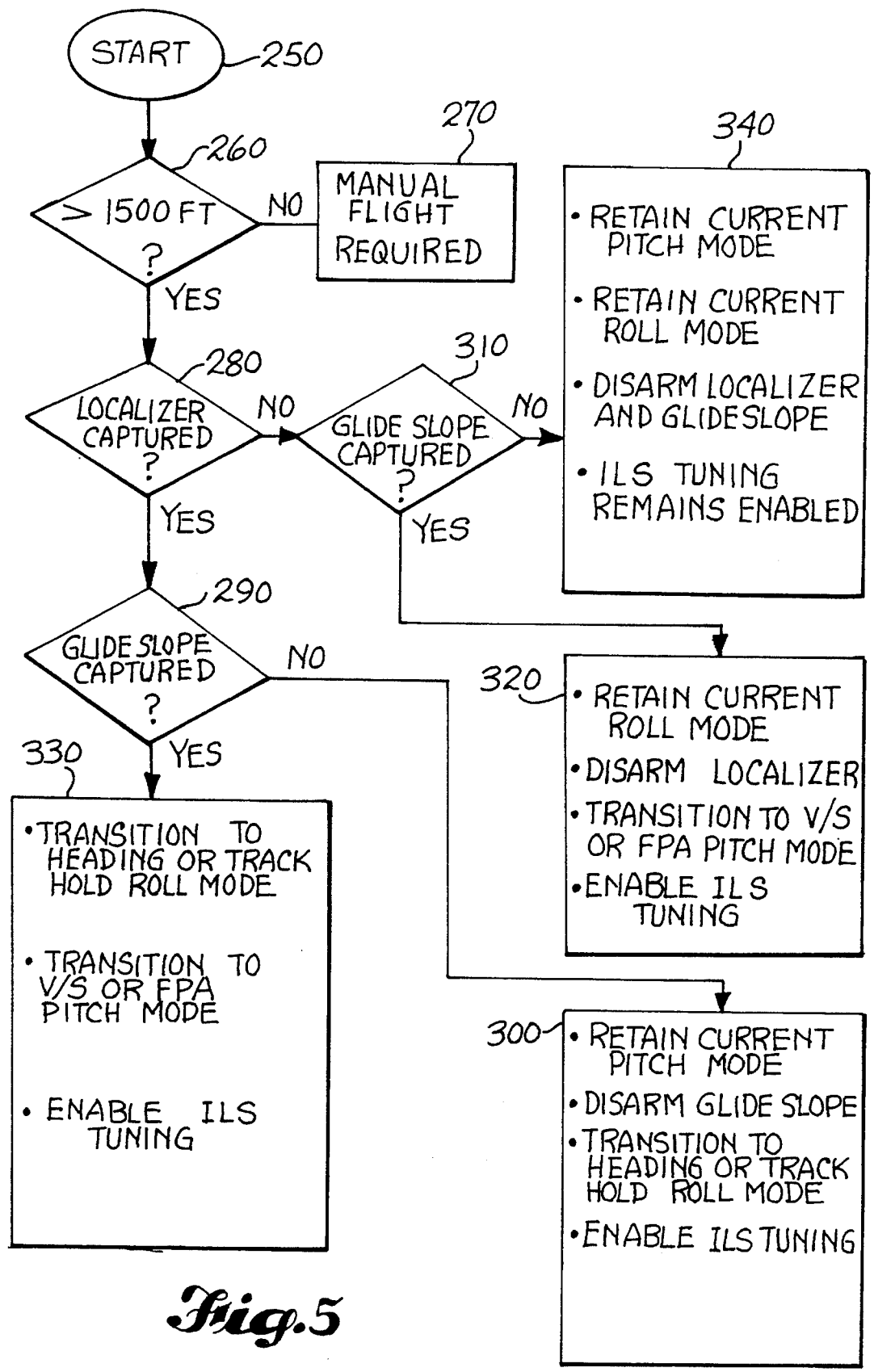
FIG. 5 is a logic flow diagram illustrating the steps performed by the control logic in accordance with the preferred embodiment of the invention.

FIG. 5 is a logic flow diagram illustrating the sequential steps performed by the present autopilot improvement to provide the functionality described above.

In the preferred embodiment of the invention, the logical steps indicated in FIG. 5 are translated to code which is controls the autopilot flight director system computer.

The system starts at block 250, indicating that the aircraft is on approach to an assigned runway with the autopilot engaged. If a transition to a new runway assignmnet is desired, the flight crew selects the approach switch 106. The system first checks at a block 260 to determine whether or not the aircraft is at a radio altitude greater than 1500 feet. If it is not, block 270 is entered and, as described herein above, the present improvement is inhibited and the flight crew must manually disengage the autopilot as in prior art designs.

However, if the aircraft is at a radio altitude greater than 1500 feet, a determination is made at block 280 as to whether or not the localizer for the first assigned approach has been captured. If localizer has been captured, a determination is then made at 290 as to whether the ILS system has captured glideslope. If localizer has been captured but glideslope has not been captured, the system enters block 300 and performs the steps set forth therein. First, the current pitch mode of the aircraft is retained. The ILS system glideslope capture is disarmed. The roll mode of the aircraft is transitioned to the predetermined mode set on the mode control panel (30 of FIG. 2) which here is assumed to be either the heading or track hold roll mode. ILS tuning is then enabled to allow the flight crew to tune to the new approach guidance signals.

FIG. 6 illustrates the change in the flight mode annunciation portion 174 of the primary flight display, (shown in FIG. 3). Note that the roll indication transitions from localizer to the flight crew selected mode, here assumed to be heading hold. Also, note that the current pitch mode, here assumed to be VNAV PTH is retained.

If it is determined at 280 that the localizer has not been captured, a determination is made at 310 as to whether or not glideslope has been captured. If localizer has not been captured but glideslope has, the sequence at 320 is entered. Specifically, the current roll mode of the aircraft is retained. The ILS localizer capture is disarmed. The aircraft is then transitioned to the predetermined aircraft pitch mode here indicated as being either vertical speed (V/S) or flight path angle (FPA). Finally, ILS tuning is enabled to allow tuning to the new approach guidance signal.

FIG. 7 illustrates the PFD flight mode annunciation display corresponding to this transition. Here, the current roll mode, LNAV is retained. However, the pitch mode, here assumed to be glideslope capture (G/S) is transitioned to the preselected pitch mode, here assumed to be vertical speed (V/S).

If localizer has been captured, via the determination at 280, and glideslope has been captured, via the determination at 290, the sequence at block 330 is entered. Here, the roll mode of the aircraft is transitioned to the preselected mode, here assumed to be either heading or track hold. The pitch mode of the aircraft is transitioned to the preselected mode, here assumed to be either vertical speed (V/S) or flight path angle (FPA). Finally, the ILS system is enabled to allow retuning to the new approach control signals.

The PFD flight mode annunciation display corresponding to block 330 is shown in FIG. 8. Here, the roll mode of the aircraft, assumed to be localizer capture, transitions to the preselected aircraft roll mode, here assumed to be heading hold. Also, the aircraft's pitch, here assumed to be glideslope capture (G/S), transitions to the preselected pitch mode, here assumed to be vertical speed (V/S).

Finally, if it is determined that the localizer has not been captured at 280 and that the glideslope has not been captured at 310, the sequence at block 340 is entered. Here, the aircraft's current pitch mode and current roll mode are retained. The ILS localizer and glideslope capture is disarmed. ILS tuning remains enabled to allow tuning to the new assigned runway.

In summary, an improved autopilot flight director system has been described which allows the flight crew to transition from one approach assignment to another without disengagement of the autopilot.

While a preferred embodiment of the invention has been described herein, it should be apparent that many modifications and variations thereto are possible, all of which fall within the true spirit and scope of the invention.

We claim:

1. In an aircraft autopilot flight director system (AFDS) wherein, on approach, the flight crew selects an instrument landing system (ILS) signal for a particular runway and the AFDS captures a localizer and a glideslope signal to direct the aircraft to said runway, an improvement allowing the flight crew to select a new ILS approach without disengaging the autopilot, comprising:

an actuator which is actuated by the flight crew to initiate a desired runway change; and logic control means responsive to said actuation of said actuator to:

a) in the event localizer but not glideslope of the initial ILS has been captured,
      i) maintain the aircraft's current pitch mode,
      ii) disarm glideslope capture,
      iii) transition aircraft roll to a predetermined roll mode, and
      iv) enable ILS tuning to the desired runway,
   b) in the event glideslope but not localizer of the initial ILS has been captured,
      i) retain the current roll mode,
      ii) disarm localizer capture,
      iii) transition aircraft pitch to a predetermined pitch mode, and
      iv) enable ILS tuning to the desired runway,
   c) in the event both localizer and glideslope have been captured,
      i) transition aircraft roll to a predetermined roll mode,
      ii) transition aircraft pitch to a predetermined pitch mode and
      iii) enable ILS tuning to the desired runway.

2. The improvement of claim 1 wherein said logic control means further includes means responsive to actuation of said actuator subsequent to retuning of the ILS to the new runway to rearm the localizer and glideslope for the new approach.

3. The improvement of either one of claims 1 or 2 wherein said logic control means includes means to inhibit selection of a new ILS runway with the autopilot engaged in the event the aircraft is below a predetermined altitude.

4. In an aircraft autopilot flight director system (AFDS) wherein, on approach, the flight crew selects an instrument landing system (ILS) signal for a particular runway and the AFDS captures a localizer and a glideslope signal to direct the aircraft to said runway, an improvement allowing the flight crew to select a new ILS runway without disengaging the autopilot, comprising:

an actuator which is actuated by tile flight crew to initiate a desired runway change; and logic control means responsive to said actuation of said actuator to:
  a) in the event localizer but not glideslope of the initial ILS has been captured,
    i) maintain the aircraft's current pitch mode,
    ii) disarm glideslope capture,
    iii) transition aircraft roll to a predetermined roll mode, and
    iv) enable ILS tuning to the desired runway.

5. The improvement of claim 4 wherein the logic control means is responsive to said actuation of said actuator to further:
  b) in the event both localizer and glideslope have been captured,
    i) transition aircraft roll to a predetermined roll mode,
    ii) transition aircraft pitch to a predetermined pitch, and
    III) enable ILS tuning to the desired runway.

6. The improvement of claim 5 wherein said logic control means further includes means responsive to actuation of said actuator subsequent to retuning of the ILS to the new runway to rearm the localizer and glideslope for the new approach.

7. The improvement of any one of claims 4 through 6 wherein said logic control means includes means to inhibit selection of a new ILS runway with the autopilot engaged in the event the aircraft is below a predetermined altitude.

8. In an aircraft autopilot flight director system (AFDS) wherein, on approach, the flight crew selects an instrument landing system (ILS) signal for a particular runway and the AFDS captures a localizer and a glideslope signal to direct the aircraft to said runway, an improvement allowing the flight crew to select a new ILS approach without disengaging the autopilot, comprising:

an actuator which is actuated by the flight crew to initiate a desired runway change; and logic control means responsive to said actuation of said actuator to:
  a) in the event glideslope but not localizer of the initial ILS has been captured,
    i) retain the current roll mode,
    ii) disarm localizer capture,
    iii) transition aircraft pitch to a predetermined pitch mode, and
    iv) enable ILS tuning to the desired runway.

9. The improvement of claim 8 wherein said logic control means is responsive to said actuation of said actuator to further:
  b) in the event both localizer and glideslope have been captured,
    i) transition aircraft roll to a predetermined roll mode, and
    ii) transition aircraft pitch to a predetermined pitch mode, and
    iii) enable ILS tuning to the desired runway.

10. The improvement of claim 9 wherein said logic control means further includes means responsive to actuation of said actuator subsequent to retuning of the ILS to the new runway to rearm the localizer and glideslope for the new approach.

11. The improvement of any one of claims 8 through 10 wherein said logic control means includes means to inhibit selection of a new ILS runway with the autopilot engaged in the event the aircraft is below a predetermined altitude.

12. In an aircraft autopilot flight director system (AFDS) wherein, on approach, the flight crew selects an instrument landing system (ILS) signal for a particular runway and the AFDS captures a localizer and a glideslope signal to direct the aircraft to said runway, an improved method for allowing the flight crew to select a new ILS approach without disengaging the autopilot, the improved method comprising the steps of:

a) providing an actuator for actuation by the flight crew to initiate a desired runway change; and b) providing logic control means responsive to said actuation of said actuator for performing the steps of:
  1) in the event localizer but not glideslope of the initial ILS has been captured,
    i) maintain the aircraft's current pitch mode,
    ii) disarm glideslope capture,
    iii) transition aircraft roll to a predetermined roll mode, and
    iv) enable ILS tuning to the desired runway,
  2) in the event glideslope but not localizer of the initial ILS has been captured,
    i) retain the current roll mode,
    ii) disarm localizer capture,
    iii) transition aircraft pitch to a predetermined pitch mode, and
    iv) enable ILS tuning to the desired runway,
  3) in the event both localizer and glideslope have been captured,
    i) transition aircraft roll to a predetermined roll mode,
    ii) transition aircraft pitch to a predetermined pitch mode, and
    iii) enable ILS tuning to the desired runway.

13. The improved method of claim 12 wherein the logic control means further performs the step of:

responding to actuation of said actuator subsequent to retuning of the ILS to the new runway to rearm the localizer and glideslope for the new approach.

14. The improved method of either one of claims 12 or 13 wherein the logic control means performs the further step of inhibiting selection of a new ILS runway with the autopilot engaged in the event the aircraft is below a predetermined altitude.

15. In an aircraft autopilot flight director system (AFDS) wherein, on approach, the flight crew selects an instrument landing system (ILS) signal for a particular runway and the AFDS captures a localizer and a glideslope signal to direct the aircraft to said runway, an improved method for allowing the flight crew to select a new ILS approach without disengaging the autopilot comprising the steps of:

a) providing an actuator which is actuated by the flight crew to initiate a desired runway change; and b) providing logic control means responsive to said actuation of said actuator for performing the steps of:
  1) in the event localizer but not glideslope of the initial ILS has been captured,
    i) maintaining the aircraft's current pitch mode,
    ii) disarming glideslope capture,
    iii) transitioning aircraft roll to a predetermined roll mode, and
    iv) enabling ILS tuning to the desired runway.

16. The improved method of claim 15 wherein the logic control means performs the further steps of:

a) in the event both localizer and glideslope have been captured,
  i) transitioning aircraft roll to a predetermined roll mode,
  ii) transitioning aircraft pitch to a predetermined pitch mode, and
  iii) enabling ILS tuning to the desired runway.

17. The improved method of claim 16 wherein said logic control means performs the further step of being responsive to actuation of said actuator subsequent to retuning of the ILS to the new runway to rearm the localizer and glideslope for the new approach.

18. The improved method of either one of claims 15 through 17 wherein the logic control means performs the further step of inhibiting selection of a new ILS runway with the autopilot engaged in the event the aircraft is below a predetermined altitude.

19. In an aircraft autopilot flight director system (AFDS) wherein, on approach, the flight crew selects an instrument landing system (ILS) signal for a particular runway and the AFDS captures a localizer and a glideslope signal to direct the aircraft to said runway, an improved method for allowing the flight crew to select a new ILS approach without disengaging the autopilot, said method comprising the steps of:

a) providing an actuator which is actuated by the flight crew to initiate a desired runway change; and providing logic control means responsive to said actuation of said actuator to perform the steps of:
  1) in the event glideslope but not localizer of the initial ILS has been captured,
    i) retaining the current roll mode,
    ii) disarming localizer capture,
    iii) transitioning aircraft pitch to a predetermined pitch mode, and
    iv) enabling ILS tuning to the desired runway.

20. The improved method of claim 19 wherein said logic control means further performs the step of being responsive to actuation of said actuator subsequent to retuning of the ILS to the new runway to rearm the localizer and glideslope for the new approach.

21. The improved method of either one of claims 19 or 20 wherein the logic control means performs the further step of inhibiting selection of a new ILS runway with the autopilot engaged in the event the aircraft is below a predetermined altitude.

* * * * *